United States Patent [19]

Okuyama

[11] Patent Number: 4,503,375
[45] Date of Patent: Mar. 5, 1985

[54] METHOD FOR CONTROLLING INDUCTION MOTOR AND APPARATUS THEREFOR

[75] Inventor: Toshiaki Okuyama, Ibaraki, Japan

[73] Assignee: Hitachi, Ltd., Tokyo, Japan

[21] Appl. No.: 582,542

[22] Filed: Feb. 22, 1984

[30] Foreign Application Priority Data

Feb. 23, 1983 [JP] Japan .................................. 57-29141

[51] Int. Cl.³ .............................................. H02P 5/40
[52] U.S. Cl. .................................... 318/802; 318/805; 318/808
[58] Field of Search ................ 318/802, 803, 807–811, 318/800, 798, 805

[56] References Cited

U.S. PATENT DOCUMENTS 4,361,794 11/1982 Kawada et al. ...................... 318/800
4,451,771 5/1984 Nagase et al. ........................ 318/802

*Primary Examiner*—David Smith, Jr.
*Attorney, Agent, or Firm*—Antonelli, Terry & Wands

[57] ABSTRACT

An induction motor is driven by a power inverter. A torque current command is determined on the basis of a difference between a speed command and an actual speed value. A slip frequency command corresponding to a magnitude of the torque current command is determined, and the slip frequency command and the actual speed value are added together to produce a primary frequency command. An oscillator generates 2-phase sinusoidal signals at a frequency coincident with the primary frequency command which are respectively in phase with the flux axis of the induction motor and 90° out of phase with respect to the flux axis. A torque current pattern signal is produced on the basis of the torque current command and the 90°-out-of-phase sinusoidal signal, and an exciting current pattern signal is produced on the basis of an exciting current setting value and the in-phase sinusoidal signal. Output current of the power inverter is controlled by the two current pattern signals. On the other hand, motor voltage of the induction motor is detected, and there are produced a parallel component and an orthogonal component of the motor voltage with respect to an exciting current component which is determined in a control system for the motor voltage. The primary frequency command is corrected by the parallel component of the motor voltage, and the exciting current setting value is corrected by the orthogonal component of the motor voltage.

10 Claims, 10 Drawing Figures

METHOD FOR CONTROLLING INDUCTION MOTOR AND APPARATUS THEREFOR

This invention relates to a method for controlling an induction motor and an apparatus therefor, in which the primary current of the induction motor is resolved into a torque current component and an exciting current component and the respective components are controlled independently.

The decomposition of the primary current of the induction motor into the torque and exciting current components and the separate control of these components are involved in a wellknown vector control method. By using the vector control method, speed can be controlled at a high response even in the induction motor as in DC motors.

The vector control method adapted for the induction motor are principally classified into a magnetic flux detection type and a slip frequency control type. The former type is disclosed in, for example, U.S. Pat. No. 3,824,437 (corresponding to West-German Laid-open No. 1941312), and the latter type is disclosed in, for examples, Japanese patent application Laid-open No. 11125/1976. The magnetic flux detection type vector control method needs a magnetic flux detector provided for the induction motor and can not be adopted for induction motors of general purpose. Therefore, in recent years, the slip frequency control type vector control method has been highlighted and has already been practiced.

According to the slip frequency control type vector control method, however, the slip frequency is calculated on condition that motor constants are invariable, with the result that if the secondary resistance of the induction motor varies with temperatures, the slip frequency can not be set to a proper value. With an improper value of the slip frequency, it is impossible to make magnitudes of torque and exciting current components of the primary current coincident with command values.

To solve this problem, a method has been proposed wherein the secondary resistance of the induction motor is measured and measured values are used for correcting the constants in calculation of the slip frequency.

This proposal, however, suffers from control errors due to detection errors by a speed detector and uneven exciting inductances caused by scattering in the manufacture of motors and still has difficulties in setting the slip frequency to a predetermined values, thus failing to provide highly accurate vector control.

The present invention contemplates elimination of the above problem and has for its object to provide method and apparatus for controlling an induction motor which can always set the slip frequency to a proper value so that torque and exciting current components of the primary current can be set to desired values.

Specifically, according to the present invention, a motor voltage of an induction motor is detected, a parallel component and an orthogonal component of the motor voltage with respect to an exciting current component which is determined in a control system for the motor voltage are measured, the primary frequency of the induction motor is so controlled that the parallel component of the motor voltage is zeroed, and an exciting current command is so corrected as to bring the orthogonal component of the motor voltage to a present value.

The motor voltage is herein defined as an induced electromotive force which equals a terminal voltage or a different between the terminal voltage and a voltage drop across a leakage impedance.

Other objects and features of the present invention will be apparent from the following description taken in conjunction with the accompanying drawings, in which.

Figure 1:
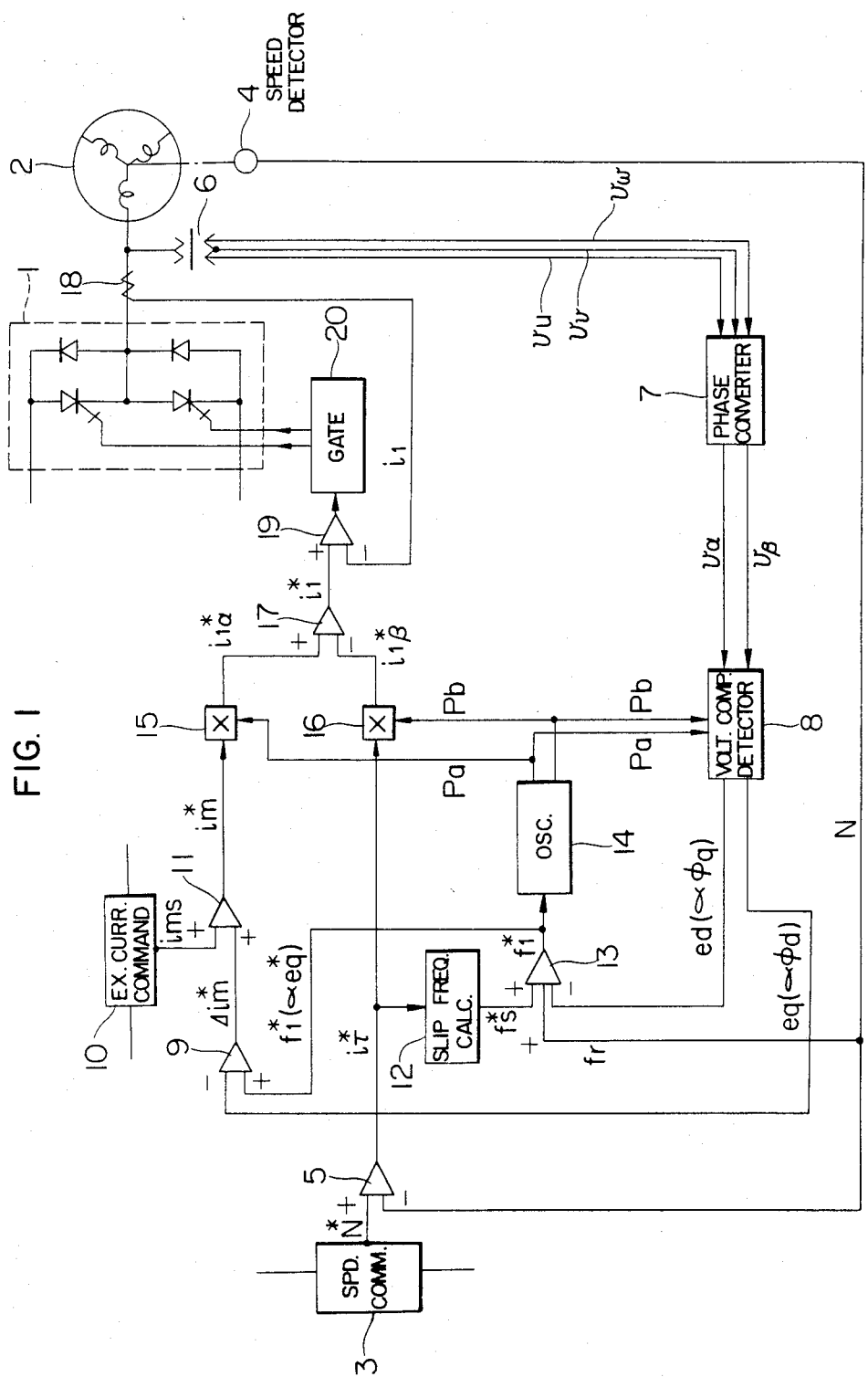
FIG. 1 is a schematic diagram showing an embodiment of the invention.

Referring now to FIG. 1, there is illustrated a control apparatus for an induction motor embodying the present invention.

In FIG. 1, a PWM inverter 1, illustrated for one phase for simplicity of illustration, consists of switching elements such as gate turn-off thyristors and diodes. A speed command circuit 3 produces a speed command signal N* for an induction motor 2. A speed detector 4 detects speeds of the inductor motor 2, and a speed control circuit 5 compares the speed command signal N* with a speed detection signal N from the speed detector 4 to produce a torque current command signal $i_T$*. A transformer 6 detects a terminal voltage v of the motor 2. A phase converter 7 converts 3-phase terminal voltage $v_u$, $v_v$ and $v_w$ detected by the transformer 6 into 2-phase voltage signals $v_\alpha$ and $v_\beta$. A voltage component detector 8 is adapted to detect rotating magnetic field coordinate components of the terminal voltage v (parallel component $e_d$ and orthogonal component $e_q$ with respect to the exciting current component). A voltage difference amplifier 9 amplifies a difference between a frequency command signal $f_1$* (proportional to a command signal $e_q$* for the orthogonal component $e_q$) and an orthogonal component signal, also designated at $e_q$, which is sent from the voltage component detector 8, so as to produce an exciting current correction signal $\Delta i_m$*. An exciting current command circuit 10 produces a preset signal $i_{ms}$ of the exciting current component resolved from the primary current of the motor 2. An adder 11 adds the exciting current setting signal $i_{ms}$ and the exciting current correction signal $\Delta i_m$* to produce an exciting current command signal $i_m$*. A slip frequency calculation circuit 12 is adapted to produce a slip frequency command signal $f_s$* which is proportional to the torque command signal $i_T$*. An adder 13 adds a rotating frequency $f_r$ which is proportional to the speed detection signal N and the slip frequency command signal $f_s$* to produce a primary frequency command signal $f_1$*. An oscillator 14 generates 2-phase sinusoidal signals Pa (=cos $\omega_1$t) and Pb (=sin $\omega_1$t) where $\omega_1$ denotes a primary angular frequency. A multiplier 15 multiplies the exciting current command signal $i_m$* and the sinusoidal signal Pa to produce a current pattern signal (sinusoidal signal) $i_{1a}$* of the primary current exciting component while a multiplier 16 multiplies the torque current command signal $i_T$* and the sinusoidal signal Pb and produces a current pattern signal (sinusoidal signal) $i_{1\beta}{}^*$ of the primary current torque component. An adder 17 connected to receive the current pattern signals $i_{1\alpha}{}^*$ and $i_{1\beta}{}^*$ adds then to produce a current pattern signal $i_1{}^*$ of the primary current of motor 2. A current detector 18 is adapted to detect current to the motor 2. A current control circuit 19 controls a primary current $i_1$ of the motor 2 so that the primary current $i_1$ is rendered proportional to the current pattern signal $i_1{}^*$. A gate circuit 20 is adapted to supply a gate signal to the PWM inverter 1. In practice, three sets of the circuit components 15 to 20 are provided corresponding to the number of phases of the inverter 1 but only one set for one phase is illustrated in FIG. 1.

Figure 2:
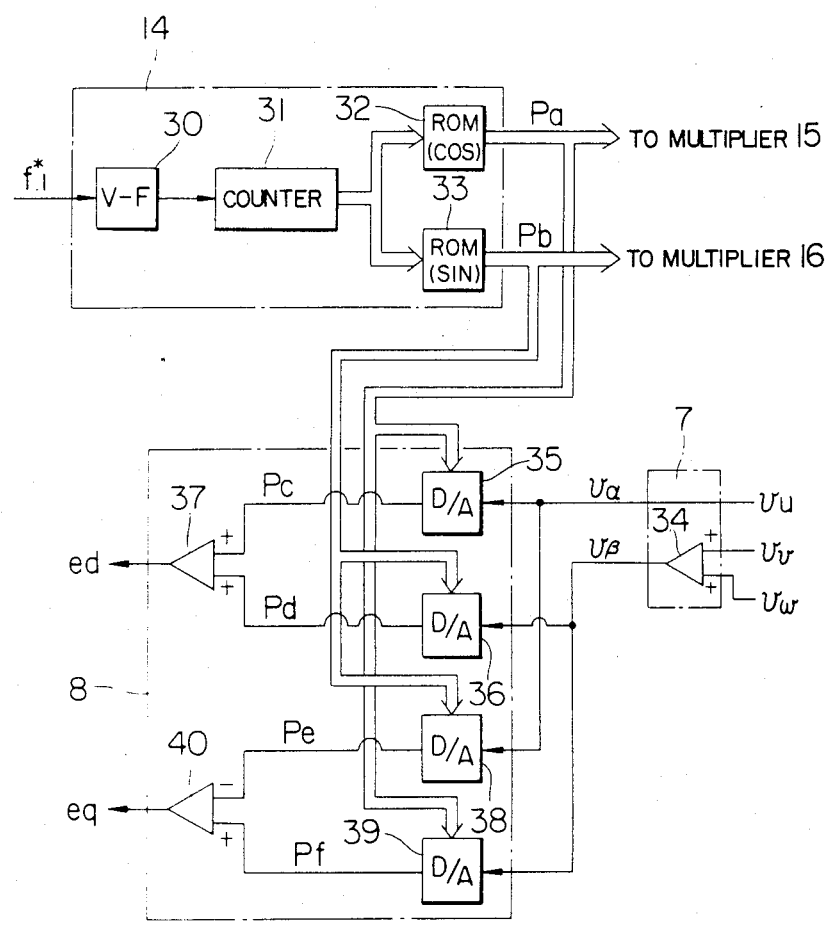
FIG. 2 is a schematic diagram showing an oscillator, a phase converter and a voltage component detector used in the embodiment of FIG. 1.

Details of the oscillator 14, phase converter 7 and voltage component detector 8 are exemplified in FIG. 2.

Referring to FIG. 2, the oscillator 14 includes a voltage to frequency converter (V/F converter) 30 which produces a pulse signal at a frequency which is proportional to the frequency command signal $f_1{}^*$, and up-down counter 31 which counts the pulse signal, and read only, memories (ROMs) 32 and 33. The detected terminal voltage signal $v_u$ is directly passed through the phase converter 7 to provide the voltage detection signal $v_\alpha$, while the detected terminal voltage signals $v_v$ and $v_w$ are subjected to vector addition at an adder 34 in the phase converter 7 to produce the voltage detection signal $v_\beta$. The voltage component detector 8 includes D/A converters 35, 36, 38 and 39, and adders 37 and 40.

In explaining the operation, the principle of the slip frequency control type vector control will first be described in brief to have better understanding of the present invention.

Assuming now that one of the axes in the rotating magnetic field coordinates of the induction motor 2 is a d axis with the other orthogonal to the d axis being a q axis and that a d-axis component $i_{1d}$ and a q-axis component $i_{1q}$ of the primary current are controlled so as to satisfy the following relations, these components can be controlled in a manner that the d-axis component $i_{1d}$ corresponds to the exciting current $i_m$ and the q-axis component $i_{1q}$ to the torque current $i_\tau$.

$$|i_1| = \sqrt{(i_{1d})^2 + (i_{1q})^2} \tag{1}$$

$$\omega_s = \frac{1}{T_2} \cdot \frac{i_{1q}}{i_{1d}} \tag{2}$$

$$\theta = \tan^{-1} \frac{i_{1q}}{i_{1d}} \tag{3}$$

where
$i_1$: primary current
$\omega_s$: slip angular frequency
$T_2$: secondary time constant
$\theta$: phase of the primary current $i_1$ with respect to the d axis.

Figure 3A:
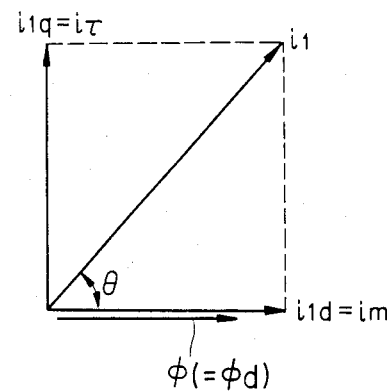
FIGS. 3a to 3c are vector diagrams useful in explaining the operation of the present invention.

If the amplitude of the primary current $i_1$, the slip angular frequency $\omega_s$ and the phase $\theta$ of the primary current $i_1$ are controlled so as to satisfy the equations (1), (2) and (3), respectively, then flux $\phi$ and torque $\tau$ can be controlled independently of each other according to the d-axis component $i_{1d}$ and the q-axis component $i_{1q}$ of the primary current $i_1$, respectively. Under this condition, a vector diagram as shown in FIG. 3a is established and the torque $\tau$ can be controlled with no response delay for the q-axis current component $i_{1q}$, as indicated by the following equation (4):

$$\tau = k\phi i_{1q} \tag{4}$$

where k is a proportional coefficient.

The operation of the control apparatus shown in FIG. 1 embodying the present invention will now be described in detail.

It will first be appreciated that amplitude and phase of the primary current $i_1$ are controlled according to the equations (1) and (3) as described below.

The oscillator 14 produces, in a manner as below, 2-phase sinusoidal signals pa and pb at the same frequency as the primary frequency command signal $f_1{}^*$ with their phases shifted from each other by 90°.

More particularly, the V/F converter 30 produces a pulse signal at a frequency proportional to the frequency command signal $f_1{}^*$. The counter 31 performs an up-count operation where the induction motor 2 rotates forwardly and a down-count operation when it rotates reversely. The counting direction of the counter 31 can be switched dependent on the polarity of the frequency command signal $f_1{}^*$. When the counter 31 for counting the pulse signal over-flows, it is brought into a state equivalent to resetting and its count is zeroed. The zero count value (all the counter outputs assume "0" level) corresponds to an electrical angle of 0° and a count value delivered when all the counter outputs assume "1" level corresponds to an electrical angle of 360°. The ROM 32 stores a cosine characteristic and the ROM 33 a sine characteristic. Since the count value of the counter 21 can correspond to electrical angles of from 0° to 360°, the ROMs 32 and 33 are addressed by a count value to produce data, now designated by Pa and Pb corresponding to the sinusoidal signals for convenience, at an address corresponding to the count value. The V/F converter 30 produces the pulse signal whose frequency varies in proportion to the frequency command signal $f_1{}^*$ as mentioned previously and hence the output data Pa and Pb of the ROMs 32 and 33 also vary in proportion to the frequency command signal $f_1{}^*$. In this manner, the ROMs 32 and 33 provide sinusoidal signals Pa and Pb, as indicated by the following equation (5):

$$\left. \begin{array}{l} Pa = \cos \omega_1 t \\ Pb = \sin \omega_1 t \end{array} \right\} \tag{5}$$

where $\omega_1$ is $2\pi f_1{}^*$.

The multiplier 15 multiplies the exciting current command signal $i_m{}^*$ and the sinusoidal signal Pa to produce the exciting current pattern signal $i_{1\alpha}{}^*$, and the multiplier 16 multiplies the torque current command signal $i_\tau{}^*$ and the sinusoidal signal Pb to produce the torque current pattern signal $i_{1\beta}{}^*$. The two current pattern signals $i_{1\alpha}{}^*$ and $i_{1\beta}{}^*$ at the polarity as illustrated are supplied to the adder 17, at which they are subjected to vector addition to provide the primary current pattern signal $i_1{}^*$. This is formularized as below.

$$i_1{}^* = i_{1\alpha}{}^* + i_{1\beta}{}^* \tag{6}$$

$$= \sqrt{i_m{}^{*2} + i_\tau{}^{*2}} \cos(\omega_1 t + \theta)$$

where $i_{1\alpha}{}^* = i_m{}^* \cos \omega_1 t$, $i_{1\beta}{}^* = -i_\tau{}^* \sin \omega_1 t$, and $$\theta = \tan^{-1} \frac{i_\tau^*}{i_m^*}$$

The current control circuit 19 receives the primary current pattern signal $i_1^*$ and the current detection signal $i_1$ of the current detector 18 and performs ignition control for the inverter 1. As a result, the output current $i_1$ of the inverter 1 is so controlled as to be proportional to the primary current pattern signal $i_1^*$.

Thus, under a reference operating condition wherein the flux axis of the motor 2 coincides with the d-axis current component $i_{1d}$, the d-axis current component $i_{1d}$ is controlled in proportion to the exciting current setting signal $i_{ms}$ ($=i_m^*$) and the q-axis current component $i_{1q}$ is controlled in proportion to the torque current command signal $i_\tau^*$, so that the relations of the equations (1) and (3) can be satisfied. Under the reference operating condition, the exciting current command signal $i_m^*$ equals the exciting current setting signal $i_{ms}$.

The phase angle $\theta$ is controlled according to the equation (2) as will be described below.

The adder 13 adds the slip frequency command signal $f_s^*$ (proportional to the torque current command signal $i_\tau^*$) from the slip frequency calculation circuit 12 and the rotating frequency signal $f_r$ proportional to the speed detection signal N to provide the frequency command signal $f_1^*$. Herein, it is assumed that the d-axis voltage component $e_d$ of the voltage component detector 8 is zero. The d-axis voltage component $e_d$ will be described later.

The primary frequency $f_1$ of the motor 2 is defined by, $$f_1 = f_r + f_s^* \quad (7).$$

An actual value $f_s$ of the slip frequency, on the other hand, is defined by, $$f_1 = f_r + f_s \quad (8).$$

In the absence of any detection errors in the rotating frequency $f_r$, $f_s^* = f_s$ stands so that the slip frequency command signal $f_s^*$ is determined according to the equation (8). Eventually, the slip frequency $f_s$ is so controlled as to follow the equation (2).

$$f_s^* = \frac{1}{2\pi T_{2s}} \cdot \frac{i_\tau^*}{i_m^*} \quad (9)$$

where $T_{2s}$ is a reference value of the secondary time constant.

As described above, the controlling is effected so as to satisfy the relations of the equations (1) to (3), thereby assuring the slip frequency control type vector control.

In carrying out the vector control as above, the influence of the control errors mentioned previously can be corrected according to the present invention as will be described below.

To explain the principle of correcting the control errors according to the present invention, it is first noted that the influence of the control errors leads to variations in the motor voltage (flux). Accordingly, it is possible to correct the control errors by using a variation of the motor voltage with respect to a motor voltage reference value to control the primary frequency and exciting current of the motor. The correction principle will further be described by referring to FIGS. 4a to 4c.

Figure 4A:
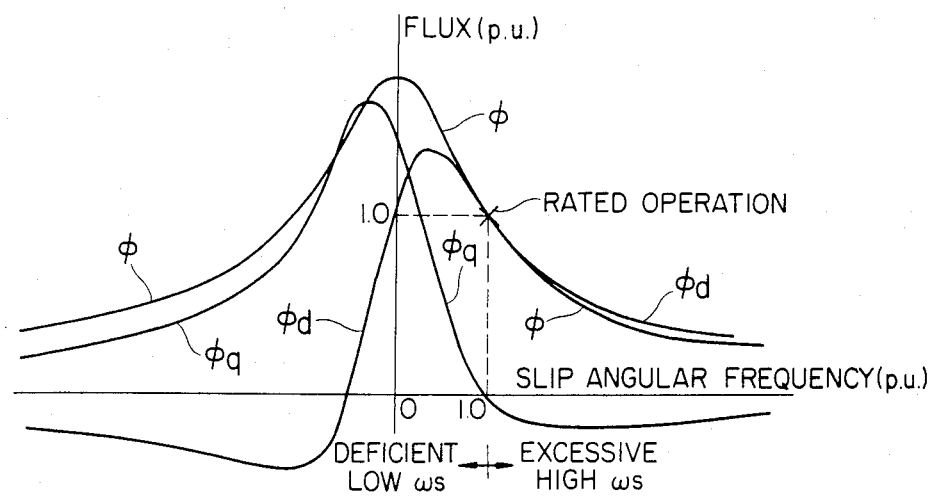
FIGS. 4a to 4c are graphical representations useful in explaining the principles of the present invention.
Figure 4B:
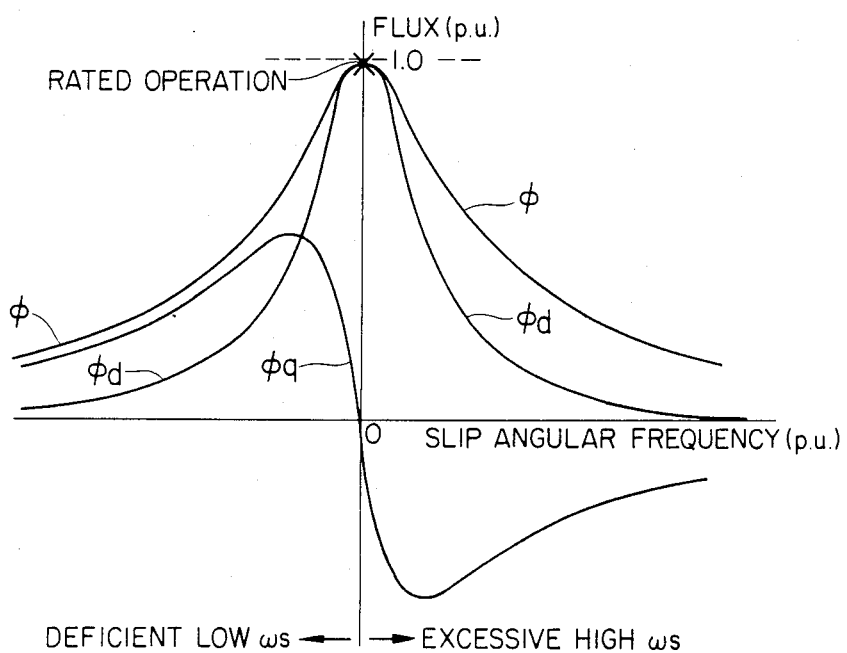
Figure 4C:
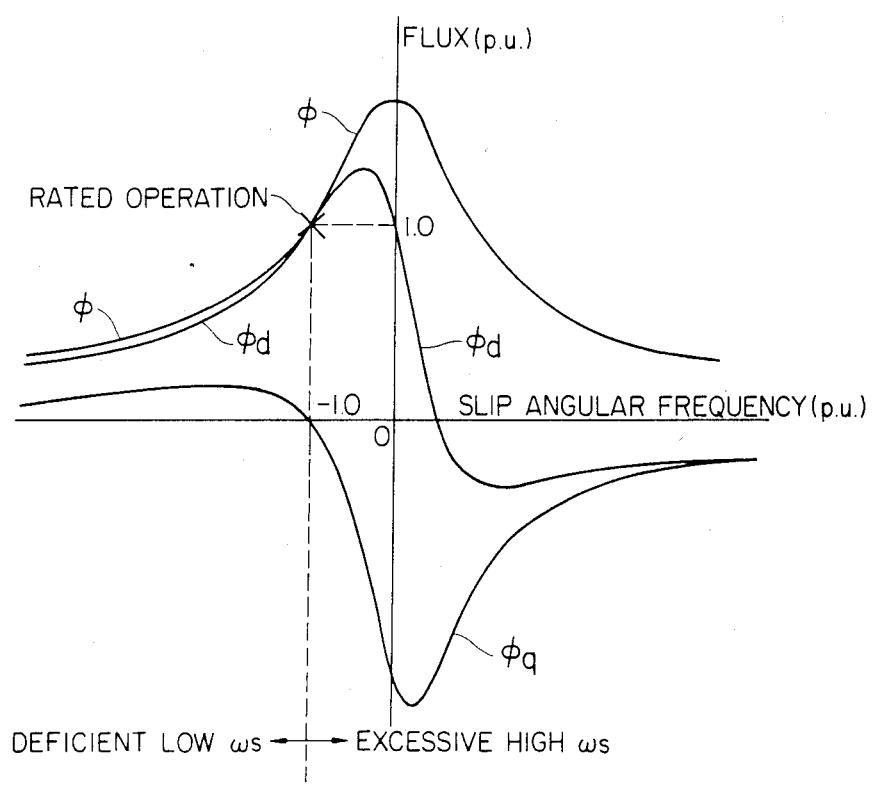

FIGS. 4a to 4c show variations in magnetic flux $\phi$ of the motor with relation to the slip frequency $f_s$ when the torque current command signal $i_\tau^*$ and the exciting current command signal $i_m^*$ are fixed. In these figures, $\phi_d$ and $\phi_q$ represent d-axis and q-axis magnetic flux components, respectively, and $\phi$ represents vector resultant flux of $\phi_d$ and $\phi_q$.

Especially, FIG. 4a illustrates a characteristic when the torque current command signal $i_\tau^*$ takes a positive rated value and the induction motor generates a positive rated torque, FIG. 4b illustrates a characteristic when the torque current command signal $i_\tau^*$ is zero, and FIG. 4c illustrates a characteristic when the induction motor 2 generates a negative rated torque.

In FIG. 4a, a point X is a standard operating point at which the q-axis flux component $\phi_q$ is zeroed. Considering the flux $\phi$, it is 1.0 (p.u.) at the standard operating point X. When the slip frequency $f_s$ exceeds the operating point X, $\phi < 1.0$ (p.u.) stands and the torque decreases. In this case, a vector diagram as shown in FIG. 3c is established. Conversely, when the slip frequency $f_s$ is deficiently low, $\phi > 1.0$ (p.u.) stands and the motor voltage increases, establishing a vector diagram as shown in FIG. 3b.

Due to the fact that the secondary resistance, for example, is smaller than a reference value, the slip frequency $f_s$ becomes excessively higher than a proper value and in this case, the slip frequency command signal $f_s^*$ from the slip frequency calculation circuit 12 exceeds a proper value of the slip frequency $f_s$ which is determined according to the equation (2).

Figure 3B:
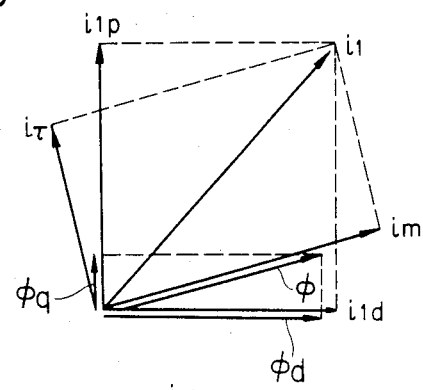
Figure 3C:
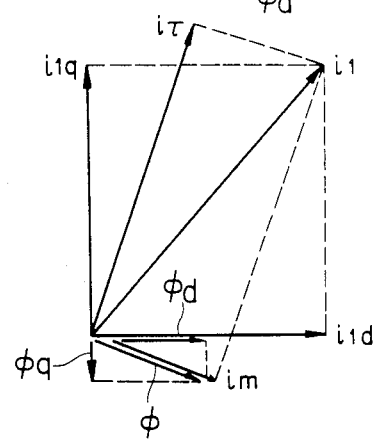

Turning to the q-axis magnetic flux component $\phi_q$, its polarity changes at the operating point X as will be seen from the vector diagrams of FIGS. 3b and 3c. When the slip frequency $f_s$ is excessively high, $\phi_q < 0$ stands and conversely, when deficiently low, $\phi_q > 0$ stands. Accordingly, the operating point can be shifted to the standard operating point by correcting the slip frequency $f_s$ according to the q-axis magnetic flux component $\phi_q$ in such a manner that when $\phi_q > 0$, the primary frequency $f_1$ is raised and when $\phi_q < 0$, the primary frequency $f_1$ is lowered.

Thus, it should be understood that the influence of the control errors can be eliminated by correcting the slip frequency $f_s$ according to the q-axis magnetic flux component $\phi_q$ in this manner, thereby assuring highly accurate vector control.

However, as will be seen from the characteristic of FIG. 4a, when the torque current command signal $i_\tau^*$ increases, that is to say, the load increases, the absolute value $|\phi_q|$ of the q-axis flux component $\phi_q$ decreases within a range defined by $\phi_q < 0$. With the absolute value $|\phi_q|$ decreased, a ratio $\Delta\phi_q/\Delta f_s$ between a change $\Delta f_s$ of the slip frequency $f_s$ and a change $\Delta\phi_q$ of the q-axis flux component $\phi_q$ is also decreased, giving rise to a decreased gain. The decrease in $|\phi_q|$ is due to the fact that as the slip frequency $f_s$ increases, the flux $\phi$ and the d-axis flux component $\phi_d$ decrease. Therefore, in order to prevent the gain from being decreased, the following control is required.

More particularly, under normal operation, the flux components $\phi_d$ and $\phi_q$ are given as follows:

$$\phi_d = (\omega_s T_2 \phi_q + M i_{1d}) \quad (10)$$

$$\phi_q = (-\omega_s T_2 \phi_d + M i_{1q}) \quad (11)$$

where M is an exciting inductance.

The q-axis flux component $\phi_q$ is zero at the standard operating point X but its polarity changes as the slip angular frequency $\omega_s(=2\pi f_s)$ varies. A gain as defined by $\Delta\phi_q/\Delta\omega_s$ is in proportion to the d-axis flux component $\phi_d$ as will be seen from the equation (11). When $\phi_q<0$, the d-axis flux component $\phi_d$ decreases, causing the gain to decrease. Accordingly, if the controlling is effected so that the d-axis flux component $\phi_d$ is kept invariable, the gain reduction can be prevented. Then, considering the d-axis flux component $\phi_d$, it will be seen from the equation (10) that the d-axis flux component $\phi_d$ varies with the d-axis current component $i_{1d}$. Thus, the d-axis flux component $\phi_d$ can be maintained at a fixed value by detecting the d-axis flux component $\phi_d$ and then controlling the d-axis current component $i_{1d}$ according to a deviation of the d-axis flux component $\phi_d$ from a rated value.

In addition, variations in the flux $\phi$ and d-axis flux component $\phi_d$ caused by unevenness of the exciting current (resulting from irregulator exciting inductances M) due to errors in manufacture of the motors can simultaneously be corrected in a similar manner by controlling the d-axis current component $i_{1d}$ so that the d-axis flux component $\phi_d$ is maintained at the fixed value.

Even in the cases of FIGS. 4b and 4c, the operation at the reference operating point can always be accomplished by controlling the primary frequency $f_1$ according to the q-axis magnetic flux component $\phi_q$ and the d-axis current component $i_{1d}$ according to the d-axis magnetic flux component $\phi_d$. In this manner, the slip frequency $f_s$ can always be controlled to the proper value conformable to the equation (2).

In the embodiment of FIG. 1, the control errors can be corrected as will be described below.

The 3-phase voltage signals $v_u$, $v_v$ and $v_w$ of the induction motor 2 detected by the transformer 6 are supplied to the phase converter 7. The phase converter 7 directly delivers out the voltage signal $v_u$ as voltage detection signal $v_\alpha$ and if also outputs the voltage detection signal $v_\beta$ as a result of vector addition of the voltage signals $v_v$ and $v_w$ at the adder 34. Therefore, the 2-phase voltage detection signals $v_\alpha$ and $v_\beta$ produced from the phase converter 7 can be expressed as, $$\left. \begin{array}{l} v_\beta = v_u \\ v_\beta = \dfrac{1}{\sqrt{3}}(v_v - v_w) \end{array} \right\} \quad (12)$$

The voltage detection signal $v_\alpha$ is supplied as a reference input signal to the D/A converters 35 and 38 of the voltage component detector 8, and the voltage detection signal $v_\beta$ is supplied as another reference input signal to the D/A converters 36 and 39. The D/A converters 35, 36, 38 and 39 serve to convert the digital sinusoidal signal (data) Pa or Pb sent from the oscillator 14 into the corresponding analog sinusoidal signals Pa or Pb whose amplitude is determined by the 2-phase voltage signals $v_\alpha$ or $v_\beta$ serving as the reference input signal. More particularly, the D/A converters 35, 36, 38 and 39 multiply the voltage detection signal $v_\alpha$ or $v_\beta$ and the sinusoidal signals Pa or Pb to produce output signals Pc to Pf as indicated by the following equation (13):

$$\left. \begin{array}{l} Pc = Pa \cdot v_\alpha = v_\alpha \cos \omega_1 t \\ Pd = Pb \cdot v_\beta = v_\beta \sin \omega_1 t \\ Pe = Pb \cdot v_\alpha = v_\alpha \sin \omega_1 t \\ Pf = Pa \cdot v_\beta = v_\beta \cos \omega_1 t \end{array} \right\} \quad (13)$$

The output signals Pc and Pd from the D/A converters 35 and 36 are added together, at the polarity illustrated in FIG. 2, by means of the adder 37, and the output signals Pe and Pf from the D/A converters 38 and 39 are added together, at the polarity also illustrated, by means of the adder 40. Output signals of the adders 37 and 40 constitute the d-axis voltage component $e_d$ and the q-axis voltage component $e_q$ which are detected by the voltage component detector and produced therefrom.

The thus obtained d-axis and q-axis voltage components $e_d$ and $e_q$ are expressed by the following determinant:

$$\begin{bmatrix} e_d \\ e_q \end{bmatrix} = \begin{bmatrix} \cos \omega_1 t & \sin \omega_1 t \\ -\sin \omega_1 t & \cos \omega_1 t \end{bmatrix} \begin{bmatrix} v_{1\alpha} \\ v_{1\beta} \end{bmatrix} \quad (14)$$

The thus detected voltage components $e_d$ and $e_q$ are related to the flux components $\phi_d$ and $\phi_q$ as below the voltage drop across the leakage impedance in the induction motor 2 is ignored:

$$\left. \begin{array}{l} e_d = -\omega_1 \phi_q \\ e_q = \omega_1 \phi_d \end{array} \right\} , \quad (15)$$

indicating that the q-axis flux component $\phi_q$ can be detected by the use of the d-axis voltage component $e_d$ and the d-axis flux component $\phi_d$ by the use of the q-axis voltage component $e_q$.

The d-axis voltage component $e_d$ detected by the voltage component detector 8 is supplied to the adder 13 together with the slip frequency command signal $f_s^*$ and the rotating frequency signal $f_r$. When the d-axis voltage component $e_d$ is negative (in the case of $\phi_q>0$), it undergoes addition, at the polarity illustrated in FIG. 1, at the adder 13 such that the frequency command signal $f_1^*$ increases. The oscillator 14 generates the sinusoidal signals Pa and Pb at a frequency which is in proportion to the frequency command signal $f_1^*$. Consequently, the output frequency $f_1$ of the inverter 1 is so controlled as to be proportional to the frequency command signal $f_1^*$.

As described above, the primary frequency $f_1$ is controlled so as to maintain the d-axis voltage component $e_d$ at zero ($\phi_q=0$), and it follows that the slip frequency $f_s$ is controlled to a value corresponding to the standard operating point X. This ensures that the slip frequency $f_s$ can be so controlled as to follow variations of the proper value of the slip frequency attendant on temperature dependent changes in the secondary resistance. Consequently, the influence of changes in the secondary resistance can be compensated. In a similar manner, the influence of detection errors by the speed detector 4 and of unevenness of the exciting inductances in the induction motor 2 can also be compensated.

On the other hand, the q-axis voltage component $e_q$ detected by the voltage component detector 8 is supplied, at the polarity illustrated in FIG. 1, to the voltage difference amplifier 9 together with the frequency command signal $f_1^*$ serving as the command signal $e_q^*$ for the q-axis voltage component $e_q$. Delivered out of the voltage difference amplifier 9 is the exciting current correction signal $\Delta i_m^*$ which is related to variations in the q-axis voltage component $e_q\ (=\phi_d)$. This exciting current correction signal $\Delta i_m^*$ and the exciting current preset signal $i_{ms}$ sent from the exciting current command circuit 10 are added together at the adder 11 to produce the exciting current command signal $i_m^*$. The exciting current $i_m$ of the induction motor 2, that is, the d-axis current component $i_{1d}$ of the primary current $i_1$ is so controlled as to coincide with the exciting current command signal $i_m^*$. As a result, the d-axis flux component $\phi_d$ is always controlled to a fixed value.

Through the control operation described thus far, the slip frequency $f_s$ can always be maintained at the proper value and the motor flux $\phi$ ($\phi=\phi_d$ for $\phi_q=0$) can be controlled to a predetermined value. Accordingly, the influence of the control errors resulting from variations in the secondary resistance and speed detection errors can be corrected to thereby provide highly accurate vector control.

While in the FIG. 1 embodiment the flux $\phi$ has been controlled to the fixed value, the flux $\phi$ may be variable in attaining the control operation wherein the torque current command signal $i_\tau^*$ may be divided by the exciting current setting signal $i_m^*$ according to the equation (9) at the slip frequency calculation circuit 12 to measure the slip frequency command signal $f_s^*$ and at the same time, the frequency command signal $f_1^*$ may be multiplied with the exciting current setting signal $i_{ms}$ to provide the command signal $e_q^*$ for the q-axis voltage component $e_q$ which in turn is supplied to the voltage difference amplifier 9.

Since the motor flux $\phi$ and the d-axis flux component $\phi_d$ take substantially the same value near the reference operating point X as shown in FIGS. 4a to 4c, the same effects can be attained by controlling the flux $\phi$, in place of the d-axis flux component $\phi_d$, to a predetermined value. In this case, a detection signal representing of the amplitude of the motor voltage may be supplied to the voltage difference amplifier 9. To promote accuracy of the control operation, the induced electromotive force may be determined by subtracting a voltage drop due to the leakage impedance from the voltage components $e_d$ and $e_q$.

Figure 5:
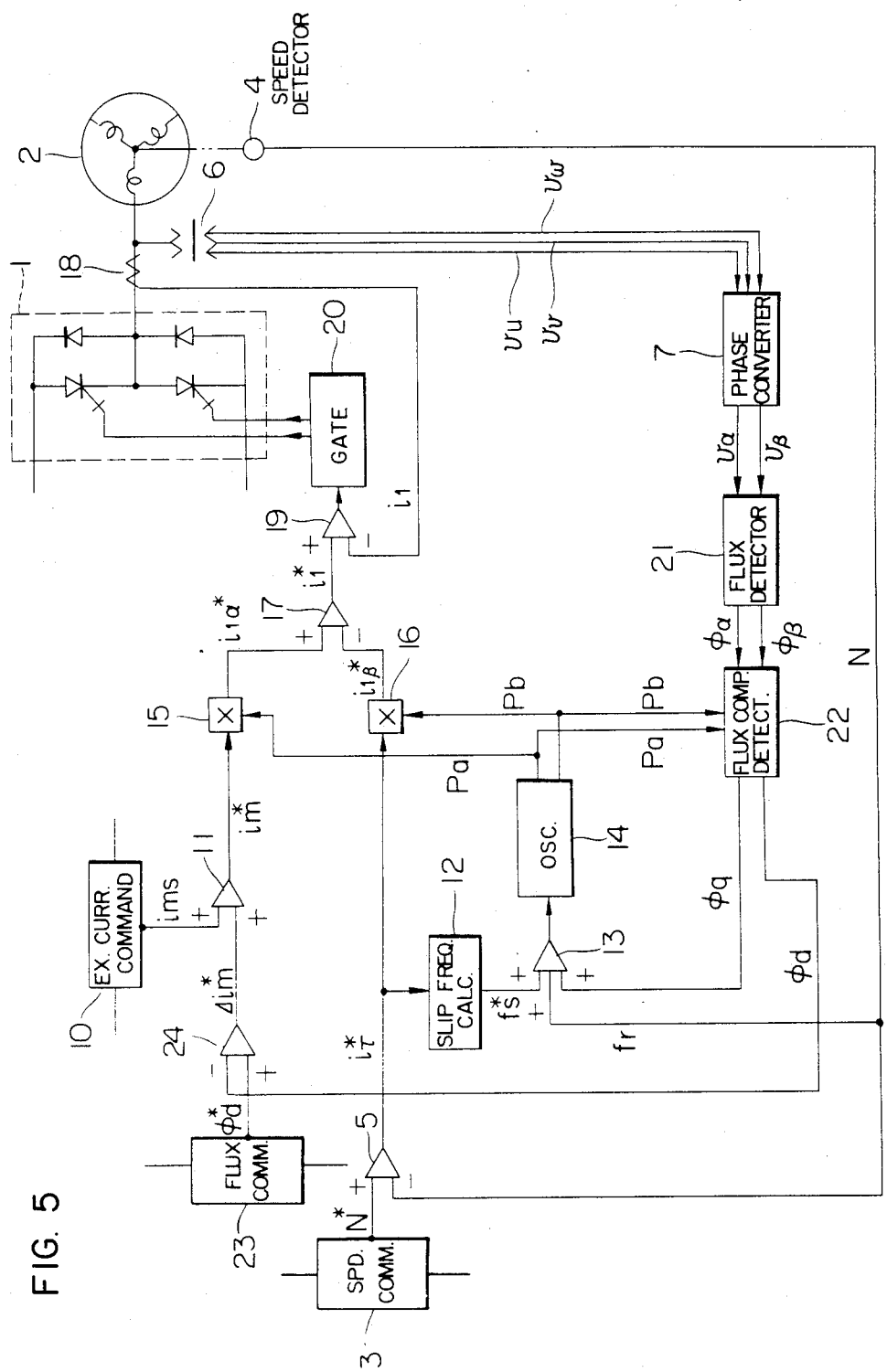
FIGS. 5 and 6 are schematic diagrams showing other embodiments of the invention.

Referring now to FIG. 5, another embodiment of the invention will be described wherein the d-axis and q-axis magnetic flux components $\phi_d$ and $\phi_q$ are directly controlled by calculating and detecting them.

In FIG. 5, parts corresponding to those in FIG. 1 are designated by the same reference numerals. A flux detector 21 is provided which produces flux components $\phi_\alpha$ and $\phi_\beta$ (2-phase AC signals) by integrating 2-phase AC signals $v_\alpha$ and $v_\beta$ of the induction motor according to the following equation (16):

$$\begin{array}{l}\phi_\alpha = -\int (v_\beta - zi_{1\beta})dt \\ \phi_\beta = \int (v_\alpha - zi_{1\alpha})dt\end{array} \quad (16)$$

where z is a leakage impedance.

In the equation (16), terms $zi_{1\beta}$ and $zi_{1\alpha}$ indicate that the influence of the leakage impedance causing a voltage drop in the motor is compensated by using the primary current $i_1$ (actual value and command value) for the sake of improving detection accuracy of flux.

A flux component detector 22 follows the following determinant (17) to provide 2-axis components of flux $\phi$, that is, an in-phase component $\phi_d$ and a 90° out-of-phase component $\phi_q$ with respect to an exciting current phase reference:

$$\begin{bmatrix}\phi_d \\ \phi_q\end{bmatrix} = \begin{bmatrix}\cos \omega_1 t & \sin \omega_1 t \\ -\sin \omega_1 t & \cos \omega_1 t\end{bmatrix} \begin{bmatrix}\phi_\alpha \\ \phi_\beta\end{bmatrix}. \quad (17)$$

When $\phi_q > 0$, this q-axis flux component $\phi_q$ detected by the flux component detector 22 is supplied to an adder 13 at the polarity by which the frequency command signal $f_1^*$ is increased. On the other hand, the d-axis flux component $\phi_d$ at the polarity illustrated in FIG. 5 is supplied to a flux difference amplifier 24 together with a flux command signal $\phi_d^*$ produced from a flux command circuit 23. The flux difference amplifier 24 is responsive to a difference between the d-axis flux component $\phi_d$ and the flux command signal $\phi_d^*$ to produce an exciting current correction signal $\Delta i_m^*$ which in turn is supplied to an adder 11. The ensuring operation is the same as that in the FIG. 1 embodiment.

As will be seen from the above, the FIG. 5 embodiment achieves the control operation comparable to that in the FIG. 1 embodiment, thus attaining the same effects.

Figure 6:
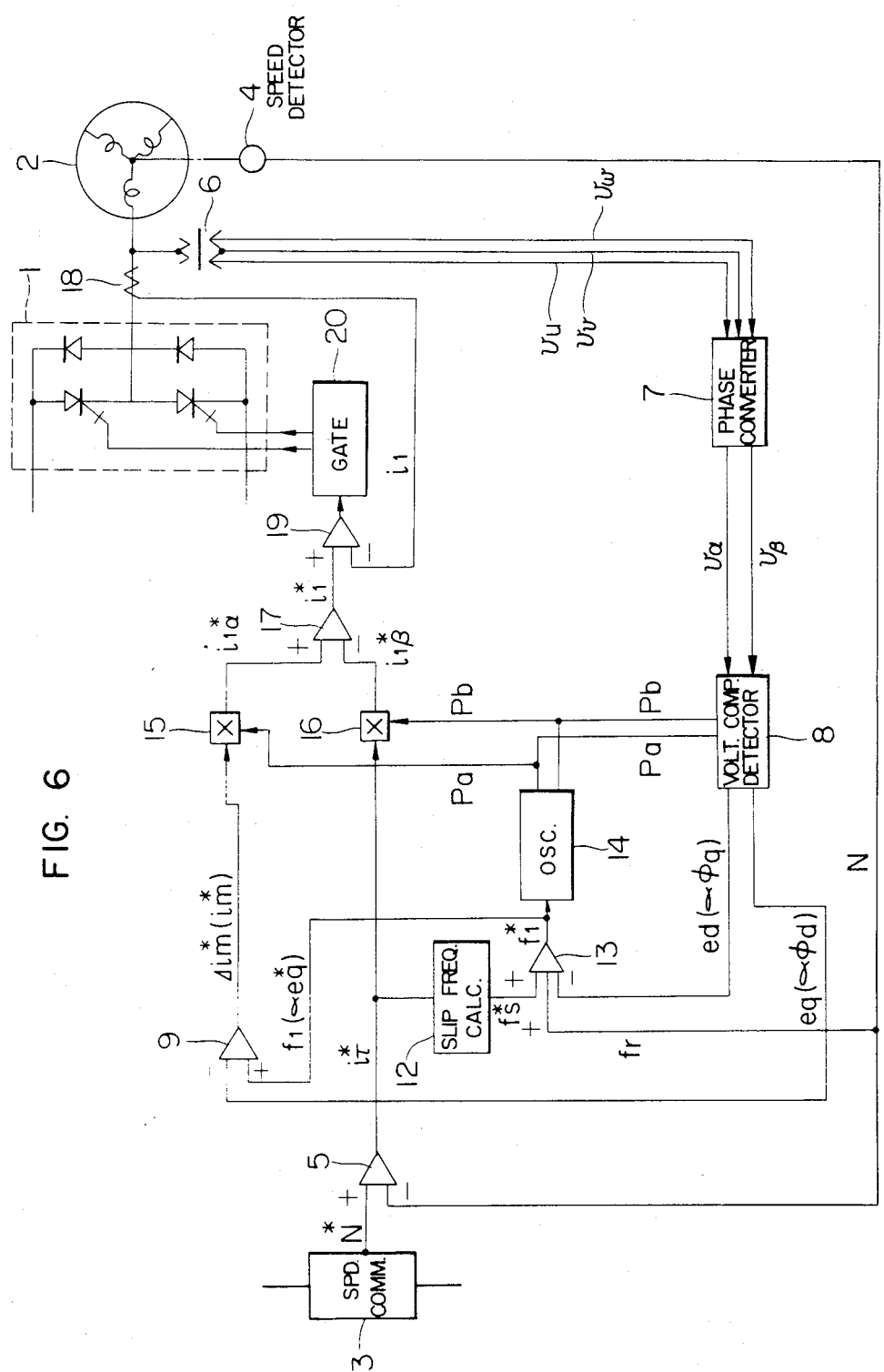

Referring to FIG. 6, there is shown a further embodiment of the invention wherein an exciting current correction signal $\Delta i_m^*$ produced from a voltage difference amplifier 9 is supplied, as exciting current command signal $i_m^*$, to a multiplier 15. With this construction, the amplitude of a sinusoidal signal Pa can also be controlled so that a q-axis voltage component $e_q$ takes a command value $e_q^*$ which is determined by a frequency command signal $f_1^*$, thereby attaining the same effects as those obtained from the FIG. 1 embodiment.

As has been described, according to the present invention, the primary frequency is controlled so that the component of the motor voltage parallel to the exciting current component is zeroed and the amplitude of the exciting current is corrected so that the orthogonal component of the motor voltage takes a preset value, thereby ensuring that the slip frequency can always take a proper value. Consequently, the influence of the control errors due to changes in the secondary resistance and speed detection errors can be corrected to provide highly accurate vector control.

Obviously, the present invention may be applied to other types of inverters than the PWM inverter as exemplified in the foregoing embodiments if their output frequency and output voltage (current) are controllable.

Further, the present invention may obviously be applied to torque control, instead of speed control, of the induction motor.

Moreover, in place of the analog control as exemplified in the foregoing embodiments, the present invention may obviously employ digital control by using a microprocessor.

I claim:

1. An induction motor controlling apparatus comprising:
   an induction motor driven by a power inverter;
   speed control means responsive to a difference between a speed command and an actual speed value, for producing a torque command for said induction motor;

slip frequency calculation means for producing a slip frequency command corresponding to a magnitude of said torque current command;

voltage component detection means detecting motor voltage of said induction motor, for producing a parallel component and an orthogonal component of the motor voltage with respect to an exciting current component which is determined in a control system for the motor voltage;

primary frequency command means responsive to said slip frequency command, actual speed value and parallel component of the motor voltage detected by said voltage component detector, for producing a primary frequency command having a magnitude that makes a said parallel component of the motor voltage zero;

exciting current command means responsive to an exciting current setting value and the orthogonal component of the motor voltage detected by said voltage component detector means, for producing an exciting current pattern signal having an amplitude that sets said orthogonal component of the motor voltage at a preset value;

torque current command means responsive to said torque current command and primary frequency command, for producing a torque current pattern signal; and current control means responsive to said torque current pattern signal and exciting current pattern signal, for controlling output current of said power inverter.

2. An induction motor controlling apparatus according to claim 1 wherein said primary frequency command means comprises oscillation means for producing a sinusoidal signal being in phase with the flux axis of said induction motor and another sinusoidal signal being 90° out of phase with respect to said flux axis, said sinusoidal signals having a frequency which coincides with said primary frequency command.

3. An induction motor controlling apparatus according to claim 1 wherein said exciting current command means produces an exciting current pattern signal having an amplitude which is determined by correcting said exciting current setting value according to a difference between the orthogonal component value of the motor voltage detected by said voltage component detection means and said primary frequency command.

4. An induction motor controlling apparatus according to claim 1 wherein said exciting current command means produces an exciting current pattern signal having an amplitude which is determined according to a difference between the orthogonal component value of the motor voltage detected by said voltage component detection means and said primary frequency command.

5. An induction motor controlling apparatus according to claim 2 wherein said voltage component detection means comprises phase conversion means for detecting phase terminal voltage signals of said induction motor and converting them into 2-phase sinusoidal signals, and multiplication means for multiplying the 2-phase sinusoidal signals produced from said phase conversion means and 2-phase sinusoidal signals produced from said oscillation means.

6. An induction motor controlling apparatus according to claim 1 wherein said slip frequency calculation means divides said torque current command by said exciting current setting value to produce the slip frequency command.

7. A method of controlling an induction motor driven by a power inverter comprising the steps of:

producing a torque current command for said induction motor on the basis of a difference between a speed command and an actual speed value;

determining a slip frequency command according to a magnitude of said torque current command;

detecting motor voltage of said induction motor to produce a parallel component and an orthogonal component of the motor voltage with respect to an exciting current component which is determined in a control system for the motor voltage;

producing a primary frequency command having a magnitude that makes said parallel component of the motor voltage zero on the basis of said slip frequency command, actual speed value and parallel component of the motor voltage;

producing an exciting current pattern signal having an amplitude that sets said orthogonal component of the motor voltage at a preset value on the basis of an exciting current setting value and said orthogonal component of the motor voltage;

producing a torque current pattern signal on the basis of said torque current command and primary frequency command; and controlling output current of said power inverter on the basis of said torque current pattern signal and exciting current pattern signal.

8. An induction motor controlling method according to claim 7 further comprising the step of producing an exciting current pattern signal having an amplitude which is determined by correcting said exciting current setting value according to a difference between said orthogonal component value of the motor voltage and said primary frequency command.

9. An induction motor controlling method according to claim 7 further comprising the step of producing an exciting current pattern signal having an amplitude which is determined according to a difference between said orthogonal component value and said primary frequency command.

10. An induction motor controlling method according to claim 7 further comprising the step of producing the slip frequency command by dividing said torque current command by said exciting current setting value.

* * * * *